Jan. 26, 1971 C. B. FALKNER 3,558,160
EXTERNAL WELLHEAD CONNECTOR MEANS
Filed Nov. 14, 1968 2 Sheets-Sheet 1

INVENTOR.
CHESTER B. FALKNER
By
Miketta, Glenny, Poms & Smith
ATTORNEYS.

Jan. 26, 1971          C. B. FALKNER          3,558,160
EXTERNAL WELLHEAD CONNECTOR MEANS
Filed Nov. 14, 1968                     2 Sheets-Sheet 2
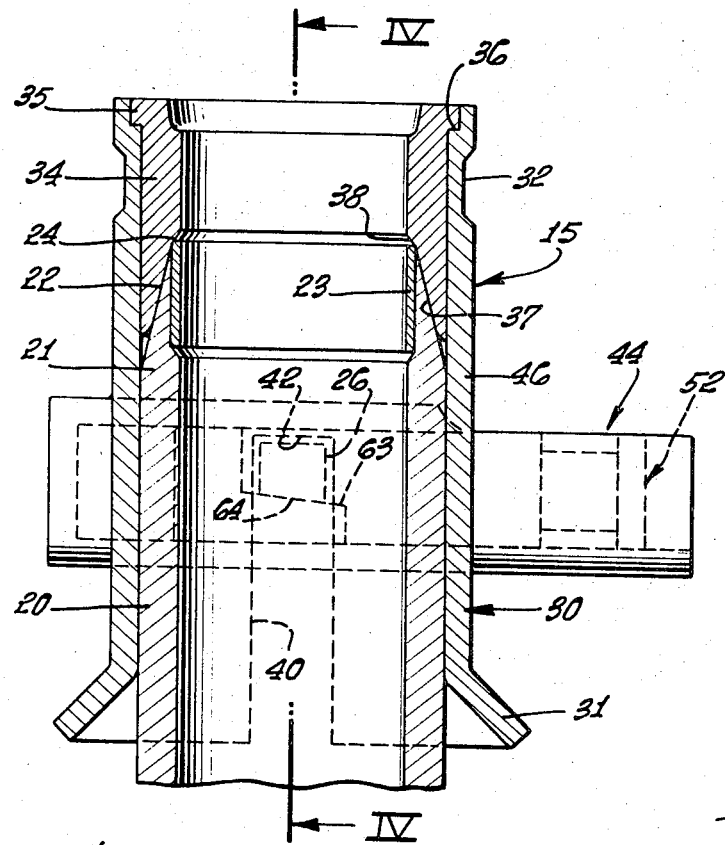
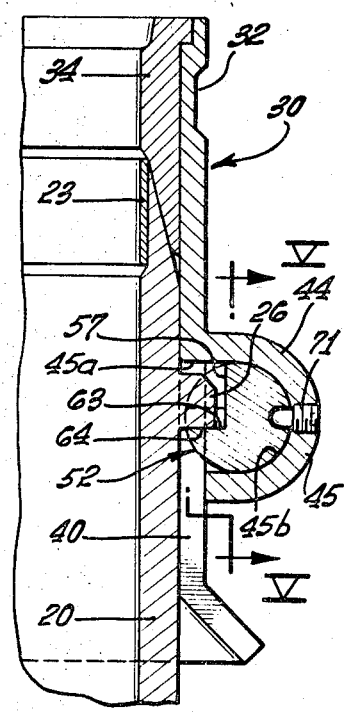
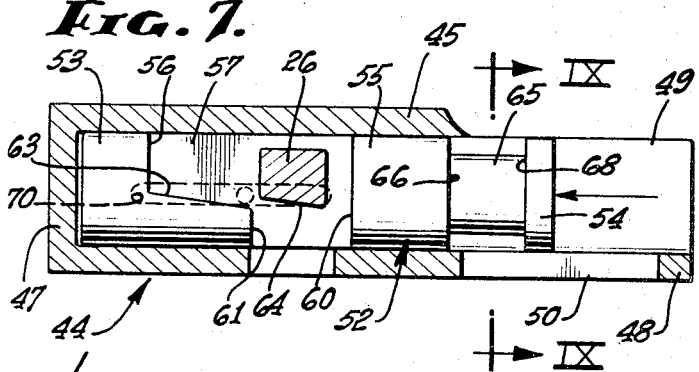
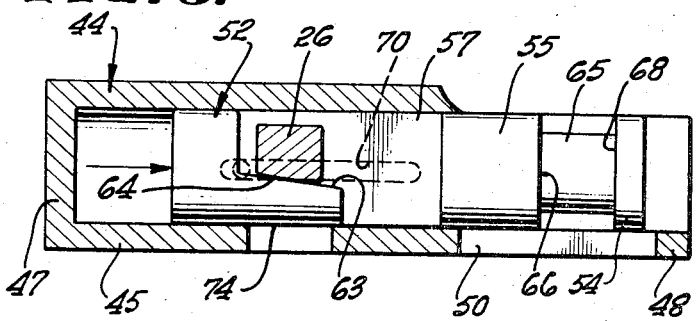
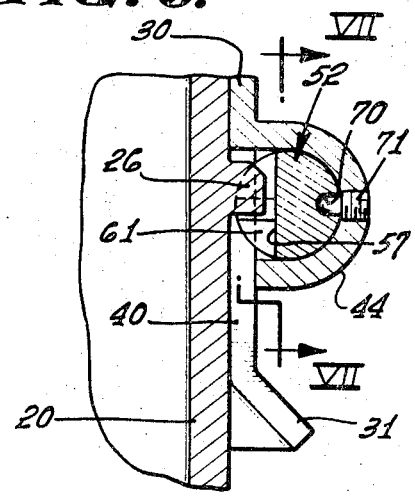
INVENTOR.
CHESTER B. FALKNER
BY
Miketta, Glenny, Poms & Smith
ATTORNEYS.

United States Patent Office 3,558,160
Patented Jan. 26, 1971

1

3,558,160
EXTERNAL WELLHEAD CONNECTOR MEANS
Chester B. Falkner, Whittier, Calif., assignor to Deep Oil Technology, Inc., Long Beach, Calif., a corporation of California
Filed Nov. 14, 1968, Ser. No. 775,872
Int. Cl. F16l 19/00
U.S. Cl. 285—18                    10 Claims

ABSTRACT OF THE DISCLOSURE

A connector means for a subsea wellhead assembly wherein wellhead members may be quickly releasably connected by means of externally actuated interlocking means comprising a locking bolt disposed and accessible at the outer surface of an outer barrel means and a lock lug on an inner mandrel means provided with wedge surface engagement with a wedge surface on the locking bolt.

BACKGROUND OF THE INVENTION

In the preparation and makeup of wellhead assemblies for subsea use various parts and subassemblies of wellhead equipment are joined together in coaxial end-to-end relation in order to provide desired control, operation, and blowout prevention of a production wellhead. Certain subassemblies may be conveniently assembled and joined together on the deck of a working platform, vessel, or on land before lowering below the water surface. Such subassemblies are then joined under water to a wellhead base or fitting or other wellhead equipment already installed. It is desirable that such subsea interconnection of well subassemblies and equipment be made quickly. positively and with relatively inexpensive secure interlocking means. In a single wellhead assembly several pieces of wellhead equipment may be interconnected by such wellhead connector means therefore simplicity in construction and inexpensiveness is very desirable. In addition to providing a quick economical wellhead connection, it is also necessary and desirable that a seal be made between interconnected well equipment or subassemblies so as to contain internal pressures and to prevent entrance into the wellhead assembly of outside fluid.

Prior proposed wellhead connectors have been expensive and have included various arrangements of radially movable locking members or dogs which interengaged recess, groove, or one of shoulder means on the wellhead members. Such locking members were usually actuated by actuating means which moved longitudinally or axially of the wellhead assembly. Such actuating means usually included annular piston means movable longitudinally of the wellhead, cam means operable by fluid pressure within the wellhead assembly, and some actuating means operable outside the wellhead assembly were intended only for emergency release of the connector.

The present invention comprises a novel inexpensive wellhead connector means having relatively few parts as compared to prior wellhead connectors and in which the interlocking of the wellhead members occurs in a zone or area essentially externally of the wellhead equipment and accessible to a diver or mechanical means on a diving bell. Generally speaking, the present invention contemplates a wellhead connector means wherein a mandrel member provided with a locking lug externally thereof is receivable in aligned nonrotatable relation with a barrel member which carries an external partially cylindrical housing

2 transversely and generally laterally projecting from the outer surface of the barrel member. Within the external housing is a limitedly movable locking bolt having wedge surface means thereon in cooperable engagement with corresponding surfaces on the locking lug on the mandrel means and having one end provided with means adapted to be engaged by an actuating device such as a mechanically manipulated means on a diving bell.

It is therefore a primary object of the present invention to disclose and provide a novel construction and arrangement for an inexpensive wellhead connector for use in subsea well operations.

An object of the present invention is to disclose and provide a wellhead connector wherein wellhead members are interconnected by manipulation of a locking means accessible generally externally of the wellhead assembly.

Another object of the present invention is to disclose and provide a wellhead connector means wherein a mandrel member and a barrel means are coaxially nonrotatably aligned in locking position and wherein a laterally movable nonrotatable locking bolt cooperates with a locking lug provided on the mandrel member for releasably interlocking the mandrel member and barrel means.

A still further object of the present invention is to disclose and provide a wellhead connector means wherein the wellhead members to be interconnected are assembled in end-to-end assembled relation and wherein the locking means of the present invention upon actuation thereof serves to accomplish a pressure seal between the two members for containing fluid pressure and for preventing inflow of sea water.

Other objects and advantages of the present invention will be readily apparent from the following description of the drawings in which an exemplary embodiment of the invention is shown.

In the drawings:

FIG. 3 is a fragmentary sectional view taken in the same plane as FIG. 2 and showing the wellhead members in assembled interlocked position;

FIG. 4 is a fragmentary vertical sectional view taken in the plane indicated by line IV—IV of FIG. 3 and showing the lock bolt and lug in locked position;

FIG. 5 is a fragmentary sectional view taken in the plane indicated by line V—V of FIG. 4;

FIG. 6 is a fragmentary sectional view taken in the same plane as FIG. 4 and showing the lock bolt and lug in unlocked position;

FIG. 7 is a fragmentary sectional view taken in the plane indicated by line VII—VII of FIG. 6;

Figure 1:
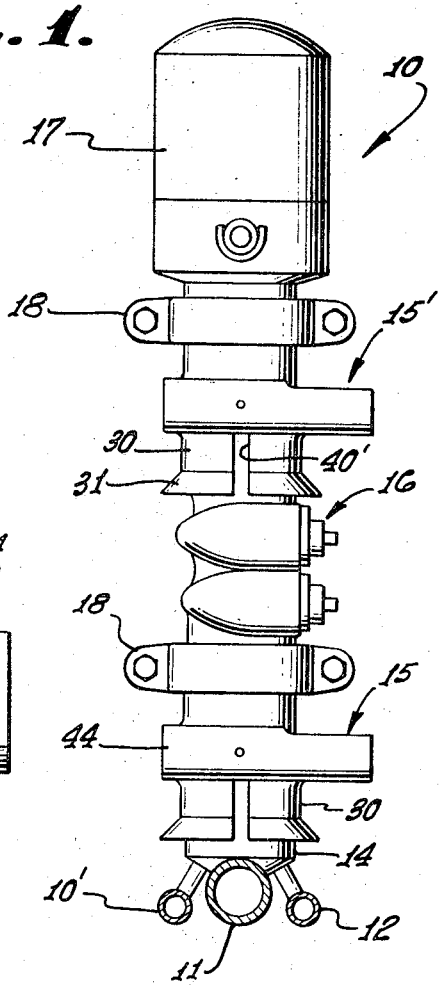
FIG. 1 is an elevational view of a subsea production wellhead embodying the present invention.
Figure 8:
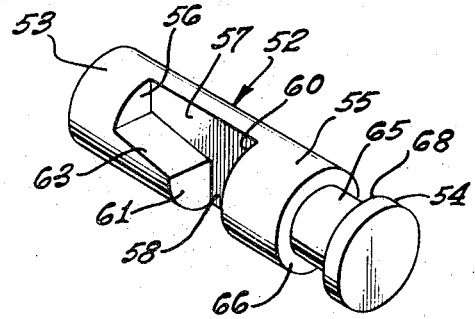
FIG. 8 is a perspective view of the lock pin.
Figure 9:
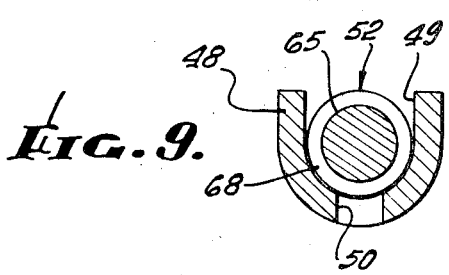
FIG. 9 is a fragmentary sectional view taken in the plane indicated by line IX—IX of FIG. 7.

Referring to the drawings, there is shown in FIG. 1 a wellhead assembly utilized particularly in a modulized subsea production wellhead arrangement as described in a co-pending application, Ser. No. 882,992 owned by the assignee of this invention and application. The subsea wellhead assembly generally indicated at 10 may be part of a subsea production wellhead and may include a plurality of fluid lines indicated at 10', 11 and 12, associated with a mandrel 14 or a suitable wellhead base. The wellhead assembly 10 further includes a wellhead connector means 15 embodying this invention and cooperably connected mandrel 14, a wellhead valve assembly 16 interconnected between the bottom wellhead connector 15 and a similarly constructed top wellhead connector 15', and a suitable top head means 17 for the wellhead. It will be understood that wellhead assembly 10 may comprise one or more valve means 16, blowout preventers, control members, and other parts of wellhead equipment joined together in axial relation with the several parts being suitably releasably interconnected by wellhead connector means 15 of the present invention. In the exemplary wellhead 10, suitable clamp means 18 may be employed for interconnecting certain parts or subassemblies of the wellhead above water.

The wellhead connector means 15 embodying the present invention comprises a mandrel member 20 of cylindrical form having a top end portion 21 provided with a beveled or tapered conical outer surface 22. The upper internal end surface of mandrel 20 may be slightly enlarged to receive and to hold an annular metal seal ring 23 of cylindrical form. The upper edge 24 of the seal ring 23 projects slightly beyond the upper edge of the top end 21 of the mandrel.

At a selected distance below the top edge of mandrel 22, a polygonally shaped locking lug 26 may project laterally outwardly from the outer surface of the mandrel 20. While only one locking lug 26 is shown, it will be understood that diametrically opposite the illustrated lug 26 the mandrel may carry a similar outwardly laterally projecting locking lug.

A hollow barrel means 30 may be provided with an outwardly and downwardly flaring skirt 31 for facilitating alignment and entry of top end portion 21 of the mandrel into the hollow barrel means 30. The inner diameter of barrel means 30 and the outer diameter of the mandrel 20 may provide a suitable sliding fit for the mandrel within the barrel means. The upper end of barrel means 30 may include an external circumferential recess 32 which may cooperate with clamp means 18 for clamping the barrel means and valve means 16 together, such assembly being normally accomplished above water.

The upper end portion of barrel means 30 may carry an internal insert member 34 having an annular flange 35 seated on a stop shoulder 36 of the barrel means. Insert member 34 extends a selected distance downwardly into the barrel means and is provided with an outwardly and downwardly flaring internal surface 37 at its bottom end portion for cooperation with tapered surface 22 of the mandrel means. In assembled position, the upper circumferential surface portion 38 of internnal surface 37 of the insert member 34 provides a stop limiting relative longitudinal movement of barrel means 30 and the mandrel member 20 and provides a sealing seat for the upper circumferential edge 24 of seal ring 23. When the barrel means 30 and the mandrel member 20 are forced into their final assembled position, the metal seal ring 24 is placed under pressure engagement with surface portion 38 to provide an effective seal.

Means for interlocking barrel means 30 and mandrel 20 in assembly may include, in addition to locking lug 26, means comprising a longitudinally extending slot 40 in the cylindrical wall 46 of the barrel means, said slot 40 having a bottom open end 41 and a closed top end 42. While only one slot 40 is shown, it will be understood that diametrically opposite the illustrated slot 40 may be a similar slot 40' in the barrel means. During assembly, slot 40 receives locking lug 26 upon relative axial or longitudinal movement of the mandrel and barrel means. In assembly, it will be noted that locking lug 26 is positioned adjacent to the top end 42 of the slot.

Barrel means 30 also includes an external housing means 44 comprising a partially cylindrical transversely extending wall 45 formed integral with cylindrical wall 46 of the barrel means 30. As best seen in FIGS. 4 and 6 wall 45 ends at barrel wall 46 and provides an internal opening 45a communicating with slot 40 so that lug 26 may be partially received within the chamber 45b formed by wall 45.

One end of the housing means may be closed by an end wall 47 and the opposite end of the housing means which extends beyond wall 46 may be provided with a generally U-shaped outer end portion 48. Between end portion 48 and the mandrel and the barrel wall 46, the housing means is provided with a top opening 49 and a bottom opening 50. The wall portions of the housing means between end portion 48 and the barrel wall 46 may be part cylindrical in section so that a vertical trough opening is provided to prevent accumulation of sand, dirt and other foreign matter by permitting passage of such matter through opening 50.

Movable lock means comprising a locking bolt 52 is slidably fitted for longitudinal reciprocal movement in chamber 45b of housing means 44. Locking bolt 52 may be generally of cylindrical metal stock including cylindrical end portions 53 and 54 and an intermediate cylindrical portion 55 spaced therefrom. Between portions 53 and 55, bolt 52 may be relieved to provide a recess means 56 including a longitudinal recess portion and a transverse recess portion. Recess means 56 includes an axially extending surface 57 lying in a plane slightly spaced from a diametrical plane of the locking bolt. At one end of the recess means 56 and adjacent to cylindrical portion 55, the surface 57 extends transversely entirely through the bolt. An entrance opening 58 at the transverse recess portion is defined by surfaces 60 provided on the intermediate cylindrical portion 55 and a surface 61 provided on a portion of the bolt adjacent to the surface 57 and between the cylindrical end portion 53 and the entrance opening 58. A longitudinally extending surface 63 on the bolt portion defining the longitudinal recess portion may be slightly inclined to coact in wedging relationship with locking lug 26. Locking lug 26 is provided with a bottom inclined surface 64 corresponding to inclined surface 63 to provide sliding wedge relationship between the surfaces 63 and 64. The angle of inclination of said surfaces 63, 64 may be varied, however, for simplicity and for positive operation, the angle may be slightly less than the angle, which under the frictional coefficient of the metal surfaces and the loading applied to the connector, would permit slippage along said surfaces and release of the bolt.

The outer end portion of the locking bolt 52 may be provided with an annular groove or recess 65 disposed between the cylindrical portions 54 and 55 so as to provide suitable annular shoulders 66 and 68 for cooperation with an actuating device provided with a yoke or suitable means for engaging the annular shoulder 66 and 68 for movement of the locking bolt in a longitudinal direction Operation of the wellhead connector means described above to interlock well members such as barrel means 30 and mandrel 20 in assembly, will be now described. Mandrel member 20 which may comprise a wellhead stub or a portion of a wellhead assembly which is fixed and stationary may be received within barrel means 30 by lowering the barrel means from a position above the mandrel means toward the mandrel means. As the barrel means approaches the mandrel means, barrel skirt 31 assists in bringing the barrel means into axial alignment with the mandrel means. The barrel means may be turned about its axis until the slots 40 in the wall of the barrel means are aligned with the locking lugs 64 on the mandrel means. When such alignment is accomplished, the barrel means may be nonrotatively lowered to its assembled position which occurs when the top circumferential edge of the metal seal ring contacts the insert member 34.

Figure 2:
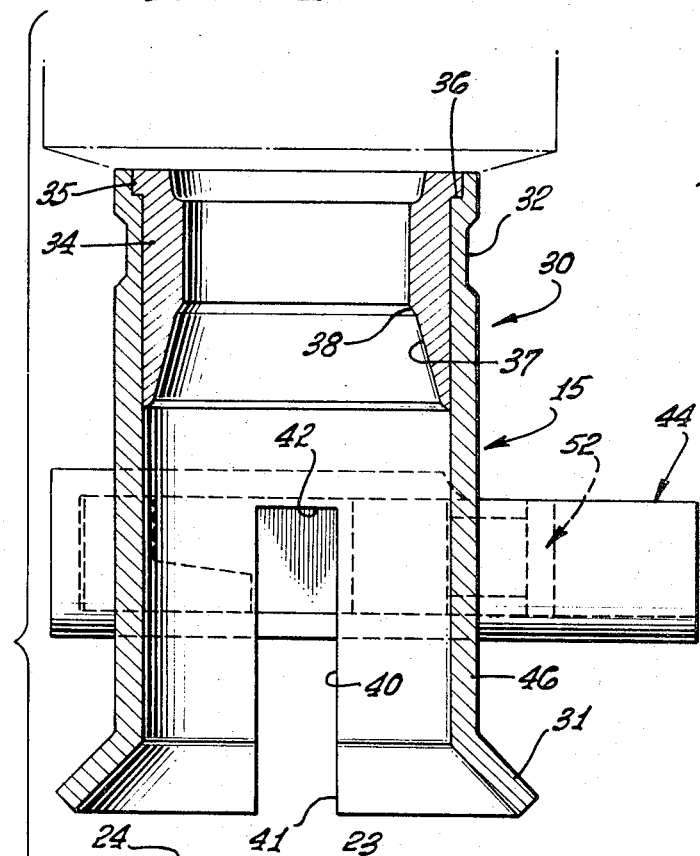
FIG. 2 is a fragmentary exploded sectional view of a portion of the wellhead assembly shown in FIG. 1, the section being taken in a vertical plane passing through the axis of the wellhead assembly.

It will be understood that while the barrel means is being lowered into assembly with the mandrel means, the locking bolt 52 is positioned in the housing means 45 so that the transverse recess portion of recess means 58 is in alignment with slot 40 so that locking lug 26 may be received within the locking chamber 45b and bolt. When the barrel means is thus assembled with the mandrel means and the locking lug 64 is in the position above-described, a locking bolt actuating means, not shown, may engage the annular recess 65 of the bolt and longitudinally move the bolt towards the right as viewed in FIGS. 2 and 3 so that the wedge face surface 63 of the locking bolt is drawn beneath the wedge surface 64 of the locking lug to wedgingly interlock the bolt and the locking lug. Such wedge engagement of locking bolt and locking lug on diametrically opposite sides of the barrel means, provides a circumferentially distributed application of pressure which causes the metal seal ring 28 to seat under virtually uniform pressure against insert member 30 and to hold and maintain the barrel means in pressure locked engagement with the mandrel 20.

Locking bolt 52 is restrained against rotation and is also positioned to receive the locking lug 64 by means of a longitudinally extending key-way or groove 70 formed in the surface of the cylindrical locking bolt 52 and which is cooperable with a key 71 threaded in the external housing 44. The fit between the key 71 and the key-way 70 is relatively loose and sloppy so that while maintaining the locking bolt 52 in proper orientation with the locking lugs 26, it will also permit sliding interengagement of the locking wedge surfaces 63 and 64.

It should be noted that when the locking bolt 52 is in fully locked position with the locking lug as shown in FIG. 5, the metal portion of the locking bolt which provides the wedge surface 63 has moved across and closes the top end of slot 40 as indicated at 74. It should also be noted that the intermediate lock bolt portion 55 has not been fully retracted from the chamber of the external housing so as to thereby limit entrances available for foreign matter entering the lock bolt chamber 45b. The lock bolt 52, if desired, may be arranged to lock in the opposite direction so that when the lock bolt is moved inwardly the wedge surfaces (in this example reversed) will be urged into tight locking relation. As previously described the angle of the wedge surfaces selected in this example is flatter than the friction angle between the two surfaces taking into consideration the loads imposed upon such surfaces. In such relationship the lock bolt is not loosened until an actuating device is applied thereto. In severe vibration applications it will be apparent that the projecting external housing can be readily modified in order to provide a suitable lock pin to prevent unwanted unlocking motion of the locking bolt.

In the example of the embodiment shown, the locking bolt 55 is arranged for manipulation by a mechanically actuated device normally carried by a diving bell. In the event the subassembly of well equipment being interconnected includes blowout preventer means, it may be desirable to actuate the locking bolt by hydraulic fluid in well known manner.

The wellhead connector described above provides a means for quickly and positively interlocking wellhead members in assembled relationship and in such a manner that relative movement between the two wellhead members is eliminated because of the wedging interrelationship of the conical interfaces of the top end of the mandrel member and the lower end of the insert member 34 and the arrangement of the wedge surfaces between the locking bolt and the locking lug, the latter wedge surfaces being disposed with respect to a different axis than the interengaging conical faces.

It will be understood that various modifications and changes may be made in the above-described well connector which come within the sphere of this invention and all such changes coming within the scope of the appended claims are embraced thereby.

I claim:

1. In combination with a wellhead assembly including inner and outer wellhead members axially movable relative to each other for assembly and disassembly, the provision of:
   means for interlocking said wellhead members in assembly including
   a locking lug projecting laterally outwardly from the outer surface of the inner of said well members;
   longitudinal through slot means in the wall of said outer wellhead member and having an open end for receiving said lug upon relative axial movement of said wellhead members during assembly;
   external housing means on said outer of said wellhead member adjacent the end of said longitudinal slot means opposite said open end;
   said housing means having an axis disposed normal to said slot means; and
   means movable axially in said external housing relative to said wellhead members for wedge locking engagement with said lug.

2. In a wellhead assembly as stated in claim 1 wherein said means movable in said external housing includes a nonrotatable lock member movable along the axis of said housing means.

3. In a wellhead assembly as stated in claim 2 wherein said locking lug includes a wedge surface, and
   wherein said lock member includes a longitudinally extending wedge surface cooperable with said locking lug wedge surface upon axial movement of said lock member.

4. A wellhead assembly as stated in claim 1 wherein said means movable in said external housing includes a lock member having an end portion provided with recess means for engagement with a lock member actuating device.

5. A wellhead assembly as stated in claim 1 wherein said external housing includes a housing extension of U-shape and includes an opening adjacent one end; and
   wherein said means movable in said housing includes an end portion positionable in said housing extension for cooperation with a lock actuating device.

6. In a wellhead assembly as stated in claim 1 including seal ring means carried by the upper end portion of said mandrel means and projecting therebeyond;
   said seal ring means and said barrel means being urged into pressure sealing engagement when said locking bolt is moved into locking relationship with said locking lug.

7. A wellhead assembly as stated in claim 1 including:
   cooperable means on said inner and outer wellhead members and spaced from said interlocking means for holding said members in wedge tight relation.

8. In combination with a subsea wellhead assembly, the provision of:
   a mandrel means having an end portion;
   an outer barrel means to receive said end portion therewithin and including a longitudinally extending through slot open at one end;
   an external lock cylinder housing on said barrel means and extending transversely thereof adjacent an upper closed end of said slot; and
   means for interlocking said mandrel means and said barrel means;
   said interlocking means including
   a locking lug carried by said mandrel means and receivable within said longitudinal slot in said barrel means for positioning said lug at said lock housing; and
   a locking bolt slidable in said lock housing and having a recess to receive said locking lug when it is positioned at said lock housing;
   said locking bolt having a locking surface slidably engageable in wedge relation with said locking lug when said locking bolt is moved longitudinally in said lock housing.

9. In a wellhead assembly as stated in claim 8 wherein said locking bolt includes means for cooperable engagement with a power actuated bolt operating means.

10. In a wellhead assembly as stated in claim 8 wherein said lock housing and said locking bolt include means for restraining relative rotation of said locking bolt with respect to said lock housing.

References Cited

UNITED STATES PATENTS

| | | | |
|---|---|---|---|
| 580,459 | 4/1897 | Mielchen | 287—53X |
| 1,200,118 | 10/1916 | Keeler | 285—362 |
| 1,561,495 | 11/1925 | Thompson | 339—75 |
| 1,910,152 | 5/1933 | Durfey | 285—362 |
| 2,122,616 | 7/1938 | Lamont | 285—332.2 |
| 3,032,125 | 5/1962 | Hiser et al. | 285—R.C.(Digest) |
| 3,070,390 | 12/1962 | Schroter et al. | 287—53TK |
| 3,198,555 | 8/1965 | Johnson et al. | 285—362X |

FOREIGN PATENTS

| | | | |
|---|---|---|---|
| 895,764 | 5/1962 | Great Britain | 287—53TK |

THOMAS F. CALLAGHAN, Primary Examiner

U.S. Cl. X.R.

285—332.2, 404